United States Patent [19]

Dunkl

[11] 4,376,713
[45] Mar. 15, 1983

[54] AC ELECTROLYTIC CAPACITOR ELECTROLYTE

[75] Inventor: Franz S. Dunkl, Williamstown, Mass.

[73] Assignee: Sprague Electric Company, North Adams, Mass.

[21] Appl. No.: 862,713

[22] Filed: Dec. 21, 1977

[51] Int. Cl.³ .............................................. H01G 9/02
[52] U.S. Cl. .................................. 252/62.2; 361/433
[58] Field of Search ........................ 252/62.2; 361/433

[56] References Cited

U.S. PATENT DOCUMENTS

| | | | |
|---|---|---|---|
| 3,293,506 | 12/1966 | Chesnot | 252/62.2 |
| 3,547,423 | 12/1970 | Jenny et al. | 252/62.2 |
| 3,609,467 | 9/1971 | Curtis | 252/62.2 |
| 3,812,039 | 5/1974 | Niwa . | |
| 4,031,436 | 6/1977 | Alwitt | 252/62.2 X |

FOREIGN PATENT DOCUMENTS

| | | | |
|---|---|---|---|
| 839159 | 4/1970 | Canada | 252/62.2 |
| 2209095 | 9/1972 | Fed. Rep. of Germany | 252/62.2 |
| 45-40240 | 12/1970 | Japan | 252/62.2 |
| 984737 | 3/1965 | United Kingdom | 252/62.2 |

*Primary Examiner*—Jack Cooper

[57] ABSTRACT

An electrolyte for an AC motor-start electrolytic capacitor consists essentially of 10 to 40 wt % mono(diethylammonium) or mono(triethylammonium) adipate as solute in ethylene glycol as solvent.

2 Claims, No Drawings

AC ELECTROLYTIC CAPACITOR ELECTROLYTE

BACKGROUND OF THE INVENTION

This invention relates to an AC electrolytic capacitor and more particularly to an electrolyte for an aluminum AC capacitor that has good temperature stability and long life.

Aluminum electrolytic capacitors generally have at least a pair of aluminum foil electrodes, one of these having a dielectric oxide formed on its surface, spacer material, a container with an end seal, and an electrolyte. The foil electrodes may be etched to increase the surface area of the foil. The foils are usually separated by dielectric spacer materials such as paper, plastic film, or combinations of these. The foils and spacers may be convolutely wound into a roll that is impregnated with electrolyte before being placed in the container and sealed.

Aluminum electrolytic capacitor electrolytes conventionally have an ionizable compound dissolved in a solvent, the commonest being the borate-glycol system. Other electrolytes are formulated with glycol ethers, organic alcohols, and amides as solvents with organic acids, at least partially neutralized, as ionogens.

Those aluminum electrolytic capacitors that find use as AC motor-start capacitors are subjected to elevated temperatures of 100° C. or more and to heavy-duty cycling, e.g., frequent starting with high voltage and current conditions. A frequent failure mode of this type of service is that of the electrolytic breaking down under the high temperature conditions. As is pointed out by Anderson in U.S. Pat. No. 4,024,442, glycol ether-based electrolytes have a boiling point that is too low for most AC motor-start applications and the use of such electrolytes may cause catastrophic failure of the capacitor at elevated temperatures. Also, glycol ether-based electrolytes tend to dissolve the potting compounds used to secure the foil roll to the container to prevent movement relative to the container. Since these ethers are good solvents, they may also attack the container and/or seal itself, particularly if either is a phenolic material. Ethylene glycol is being used as a solvent for AC electrolytic capacitors electrolytes now for these and other reasons.

SUMMARY OF THE INVENTION

It is an object of this invention to provide an improved ethylene glycol-based electrolyte for an aluminum AC electrolytic capacitor, particularly of the motor-start type.

It is another object of this invention to provide such an electrolyte having good temperature characteristics, stability, and long operating life together with a desirable resistivity.

These objects are attained by the use of an electrolyte consisting essentially of ethylene glycol (which may contain some water) and mono-diethylammonium or mono-triethylammonium adipate as solute. The solute may be prepared by reacting diethylamine or triethylamine with adipic acid in ethylene glycol. Since, preferably, the solute is prepared in the solvent, it should be understood that impurities in the starting materials and minor amounts of unreacted starting materials or other products may be present.

DESCRIPTION OF THE PREFERRED EMBODIMENTS

The mono-diethyl or triethyl ammonium adipate is used as sole solute in an ethylene glycol-based electrolyte for an AC capacitor, particularly a motor start capacitor. A minor amount of water may be included to adjust resistivity to the desired level.

The following examples are presented to show the usefulness of such compositions.

EXAMPLE I

The resistivities of various solutions of monodiethylammonium adipate and mono-triethylammonium adipate in ethylene glycol are given in Tables 1 and 2, respectively. All percentages are weight-percent. Temperature-resistivity characteristics of the diethylammonium adipate electrolyte are compared to those of a conventional borate-glycol electrolyte in Table 3.

TABLE I

| | % by weight | | | | |
|---|---|---|---|---|---|
| Monodiethylammonium adipate | 40 | 30 | 20 | 10 | 5 |
| Ethylene glycol | 57 | 67 | 77 | 87 | 92 |
| Water | 3 | 3 | 3 | 3 | 3 |
| Resistivity ($\Omega$ — cm, 25° C.) | 526 | 490 | 541 | 787 | 1307 |

TABLE II

| | % by weight | | | | |
|---|---|---|---|---|---|
| Monotriethylammonium adipate | 40 | 30 | 20 | 10 | 5 |
| Ethylene glycol | 57 | 67 | 77 | 87 | 92 |
| Water | 3 | 3 | 3 | 3 | 3 |
| Resistivity ($\Omega$ — cm, 25° C.) | 683 | 650 | 707 | 1039 | 1723 |

TABLE III

| | Resistivity in $\Omega$ — cm at | | | | | | | |
|---|---|---|---|---|---|---|---|---|
| | −40° C. | −30° C. | −20° C. | 0° C. | 25° C. | 50° C. | 85° C. | 105° C. |
| Borate-glycol | >300,000 | 78,000 | 30,000 | 5600 | 1150 | 400 | 125 | 80 |
| Diethylammonium adipate | 35,000 | 13,000 | 5,900 | 1600 | 495 | 210 | 88 | 65 |

EXAMPLE II

This example shows life test results for AC-motor start, 110 VAC capacitors made with a conventional electrolyte (ammonium pentaborate in ethylene glycol) vs 24% mono-diethylammonium adipate in ethylene glycol. The resistivity of this electrolyte was 475$\Omega$-cm. The test was run for 556 hr, 60 1-sec starts/hr. Standard and experimental design capacitors made with 160 V and 170 V aluminum foil were tested. The numbers in parentheses give the number of each type of unit tested at 115 VAC, 60 Hz, and 65° C.; the results presented are an average of these units.

TABLE IV

|  | Amps | Watts | Cap (μF) | Power Factor (%) |
|---|---|---|---|---|
| Conventional electrolyte |  |  |  |  |
| 160V experimental design (6) | 5.9 | 49 | 136.1 | 7.2 |
| 160V standard design (3) | 6.1 | 69 | 140.3 | 9.9 |
| 170V experimental design (7) | 6.2 | 75 | 140.7 | 10.7 |
| 170V standard design (5) | 6.1 | 78 | 141.2 | 11.0 |
| Mono-diethylammonium adipate electrolyte |  |  |  |  |
| 160V experimental design (7) | 5.8 | 35 | 132.9 | 5.3 |
| 160V standard design (3) | 6.0 | 53 | 138.4 | 7.5 |
| 170 experimental design (8) | 6.0 | 64 | 139.6 | 9.2 |
| 170V standard design (2) | 6.3 | 72 | 144.2 | 10.0 |

EXAMPLE III

This example shows the results of life tests as described in Example 2 but run for 833 hrs with experimental design capacitors using 24% mono-triethylammonium adipate electrolyte.

TABLE V

|  | Amps | Watts | Cap (μF) | Power Factor (%) |
|---|---|---|---|---|
| Conventional electrolyte |  |  |  |  |
| 160V experimental (12) | 5.7 | 48 | 130 | 7.4 |
| 170V experimental (12) | 6.0 | 44 | 138 | 6.4 |
| Mono-triethylammonium adipate |  |  |  |  |
| 160V experimental (16) | 5.8 | 45 | 133 | 5.5 |
| 170V experimental (16) | 5.8 | 36 | 137 | 5.3 |

The results show the improvement in power factor in capacitors using the electrolytes of the present invention.

What is claimed is:

1. An electrolyte for an aluminum AC motor-start capacitor consisting essentially of 10 to 40 wt % of a solute selected from mono-diethyl-ammonium adipate and mono-triethylammonium adipate and as solvent, ethylene glycol and a minor amount of water, said electrolyte having a resistivity measured at 25° C. of 475 to 1039 ohm-cm.

2. An electrolyte according to claim 1 wherein said solute is prepared in the ethylene glycol solvent by reacting adipic acid and diethylamine or triethylamine therein in a 1:1 mole ratio.

* * * * *

UNITED STATES PATENT AND TRADEMARK OFFICE
CERTIFICATE OF CORRECTION

PATENT NO. : 4,376,713
DATED : March 15, 1983
INVENTOR(S) : Franz S. Dunkl

It is certified that error appears in the above—identified patent and that said Letters Patent is hereby corrected as shown below:

Column 1, line 31, "electrolytic" should read
-- electrolyte --
Column 2, after Table III, should appear
 -- The borate-glycol electrolyte consisted of 66.8 wt % ethylene glycol, 33.0 wt % ammonium pentaborate, 0.2 wt % ammonium dihydrogen phosphate. The adipate electrolyte was prepared from 713 g glycol, 40 ml water, 83 g. diethylamine, and 165 g adipic acid. --

Signed and Sealed this

Thirtieth Day of October 1984

[SEAL]

Attest:

GERALD J. MOSSINGHOFF

Attesting Officer

Commissioner of Patents and Trademarks